United States Patent
Xu et al.

(10) Patent No.: US 7,702,708 B2
(45) Date of Patent: Apr. 20, 2010

(54) FREQUENCY/DELAY SYNTHESIZER ARCHITECTURE

(75) Inventors: Gonggui Xu, Plano, TX (US); Haydar Bilhan, Dallas, TX (US); Liming Xiu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1260 days.

(21) Appl. No.: 11/221,674

(22) Filed: Sep. 7, 2005

(65) Prior Publication Data

US 2007/0055718 A1    Mar. 8, 2007

(51) Int. Cl.
G06F 1/02 (2006.01)
H03B 19/00 (2006.01)
(52) U.S. Cl. ............................. 708/270; 327/113
(58) Field of Classification Search ................ 708/270, 708/271, 273
See application file for complete search history.

(56) References Cited

U.S. PATENT DOCUMENTS 6,329,850 B1 * 12/2001 Mair et al. .................. 327/107
2003/0118142 A1 * 6/2003 Xiu et al. .................... 375/376
2004/0008805 A1 * 1/2004 Xiu et al. .................... 375/376

OTHER PUBLICATIONS

Hugh Mair and Liming Xiu; "An Architecture of High-Performance Frequency and Phase Synthesis"; IEEE Journal of Solid-State Circuits; vol. 13, No. 6; Jun. 2000.
Liming Xiu and Zihong You; "An "Flying-Adder" Architecture of Frequency and Phase Synthesis with Scalability"; IEEE Transaction on VLSI System; Oct. 2002.

* cited by examiner

*Primary Examiner*—Chuong D Ngo
(74) *Attorney, Agent, or Firm*—John J. Patti; Wade J. Brady, III; Frederick J. Telecky, Jr.

(57) ABSTRACT

An apparatus employing control words to present a synthesized output signal having an output frequency and a delay with respect to an input signal includes: (a) A multiplexer receiving the input signal and having an output and an address input. (b) An output unit generates the output signal in response to a drive signal from the multiplexer. (c) A first register coupled with the multiplexer output. (d) A second register coupled with the multiplexer and the first register. The first register responds to a multiplexer output signal to provide a first control signal to the second register based upon the control words. The second register responds to the multiplexer output signal to provide a second control signal to the address input based upon the first control signal and the control words. The multiplexer presents the drive signal in response to the second control signal.

12 Claims, 3 Drawing Sheets

FREQUENCY/DELAY SYNTHESIZER ARCHITECTURE

TECHNICAL FIELD

The present invention generally relates to frequency synthesizers and, more particularly, to frequency/delay synthesizer architecture used with voltage controlled oscillators.

BACKGROUND

One example of frequency synthesizer is known as a "Flying Adder" frequency synthesis architecture. The architecture is described in "An Architecture of High Performance Frequency and Phase Synthesis", by Hugh Mair and Liming Xiu; IEEE Journal of Solid-State Circuits, Vol. 35, No. 6, June 2000. Mair and Xiu describe a voltage controlled oscillator (VCO) presenting a VCO input reference signal having thirty-two phases as an input signal to a multiplexer device.

Referring preliminarily to FIG. 1 (which is described below in greater detail), a frequency synthesis section includes a frequency synthesizer multiplexer device that selects one of the thirty-two phases of the VCO input reference signal to present a drive signal $V_{MUX}$ to trigger a toggle flip-flop and generate a frequency output signal CLK having a rising edge and a falling edge. A control word FREQ (a digital word) determines the time (i.e., the number of phases) that should elapse between two adjacent selections of address by the frequency synthesizer multiplexer device. A frequency synthesis register provides and memorizes the extant selection address of the frequency synthesizer multiplexer device. Drive signal $V_{MUX}$ is applied as a clocking signal for the frequency synthesis register. The next subsequent frequency synthesizer multiplexer selection address stored in the frequency synthesis register is the sum of the extant selection address and the control word FREQ.

Additionally, the multiple VCO phases may be programmed to obtain a delay with respect to the input reference signal using a delay synthesis section that includes a delay synthesizer multiplexer device that selects one of the thirty-two phases of the VCO input reference signal to present a drive signal $V_{MUX-D}$ to trigger a toggle flip-flop and generate a delay output signal CLK-D. A control word DELAY (also a digital word) determines the incremental value (i.e., the number of phases) to be added to the frequency synthesizer multiplexer selection address. A delay synthesis register provides and memorizes the extant selection address (frequency address plus the delay shift) for the delay synthesizer multiplexer device. Drive signal $V_{MUX-D}$ is applied as a clocking signal for the delay synthesis register.

A result is that both the drive signals $V_{MUX}$, $V_{MUX-D}$ have the same frequency that is determined by control word FREQ. However, the rising edge of drive signal $V_{MUX-D}$ is determined by control word DELAY and may therefore differ from the rising edge of drive signal $V_{MUX}$. If drive signal $V_{MUX}$ (which is always earlier than $V_{MUX-D}$), is offset with respect to drive signal $V_{MUX-D}$ by an amount less than computation time of the adder summing the two inputs (extant address in the frequency synthesizer multiplexer device and control word DELAY), a timing violation may be produced that will render the apparatus inoperative.

The requirement for using two multiplexing devices and the disparately timed clocking signals for the frequency synthesis register and the delay synthesis register contribute to disadvantages for signal synthesis apparatuses of the type represented in FIG. 1. Among the disadvantages are high part count and consequent large die area required for implementing the circuitry. A further disadvantage is the possible timing violation that may occur because of the disparately timed clocking signals used for the frequency synthesis register and the delay synthesis register.

SUMMARY

In accordance with a preferred embodiment of the present invention, An apparatus employing control words to present a synthesized output signal having an output frequency and a delay with respect to an input signal includes: (a) A multiplexer receiving the input signal and having an output and an address input. (b) An output unit coupled with the multiplexer generates the output signal in response to a drive signal from the multiplexer. (c) A first register coupled with the multiplexer output. (d) A second register coupled with the multiplexer output, the multiplexer address input and the first register. The first register responds to a multiplexer output signal to provide a first control signal to the second register based upon the control words. The second register responds to the multiplexer output signal to provide a second control signal to the multiplexer address input based upon the first control signal and the control words. The multiplexer presents the drive signal in response to the second control signalman apparatus is provided. The apparatus comprises a first multiplexer that receives a first signal; a second multiplexer that receives the first signal; an output circuit that is coupled to each of the first and second multiplexers; a delay synthesis section having: a first adder that receives at first portion of a control word; and a first register that is coupled to the first adder and the output circuit, wherein the output circuit clocks the first register; and a frequency synthesis section having: a second adder that receives a second portion of the control word; a first set of registers that are coupled in series with one another, wherein each register from the first set of registers is coupled to the output circuit so as to be clocked by the output circuit, wherein the first register from the first set of registers is coupled to the second adder and the last register from the first set of registers is coupled to a control input of the first multiplexer; a second register that is coupled to the output circuit and that receives a delay signal, wherein the output circuit clocks the fourth register; a third adder that is coupled to the fourth register and the first register; and a second set of registers that are coupled in series with one another, wherein each register from the second set of registers is coupled to the output circuit so as to be clocked by the output circuit, wherein the first register from the second set of registers is coupled to the third adder and the last register from the second set of registers is coupled to a control input of the second multiplexer.

In accordance with a preferred embodiment of the present invention, the first adder is coupled to at least one register from the second set of registers.

In accordance with a preferred embodiment of the present invention, the first set of registers further comprises: a third register that is coupled to the first adder and the output circuit; and a fourth register that is coupled to the third register, the output circuit, and the control input of the first multiplexer.

In accordance with a preferred embodiment of the present invention, the first set of register further comprises an inverter that is coupled between the fourth register and the output circuit.

In accordance with a preferred embodiment of the present invention, the second set of registers further comprises: a third register that is coupled to the first adder, the third adder, and the output circuit; and a fourth register that is coupled to the third register, the output circuit, and the control input of the second multiplexer.

In accordance with a preferred embodiment of the present invention, the output circuit further comprises: a third multiplexer that is coupled to each of the first and second multiplexers; and a flip-flop that is coupled to the third multiplexer.

In accordance with a preferred embodiment of the present invention, an apparatus is provided. The apparatus comprises a voltage controlled oscillator (VCO); a first multiplexer that is coupled to the VCO; a second multiplexer that is coupled to the VCO; an output circuit that is coupled to each of the first and second multiplexers; a delay synthesis section having: a first adder that receives at first portion of a control word; and a first register that is coupled to the first adder and the output circuit, wherein the output circuit clocks the first register; and a frequency synthesis section having: a second adder that receives a second portion of the control word; a first set of registers that are coupled in series with one another, wherein each register from the first set of registers is coupled to the output circuit so as to be clocked by the output circuit, wherein the first register from the first set of registers is coupled to the second adder and the last register from the first set of registers is coupled to a control input of the first multiplexer; a second register that is coupled to the output circuit and that receives a delay signal, wherein the output circuit clocks the fourth register; a third adder that is coupled to the fourth register and the first register; and a second set of registers that are coupled in series with one another, wherein each register from the second set of registers is coupled to the output circuit so as to be clocked by the output circuit, wherein the first register from the second set of registers is coupled to the third adder and the last register from the second set of registers is coupled to a control input of the second multiplexer.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
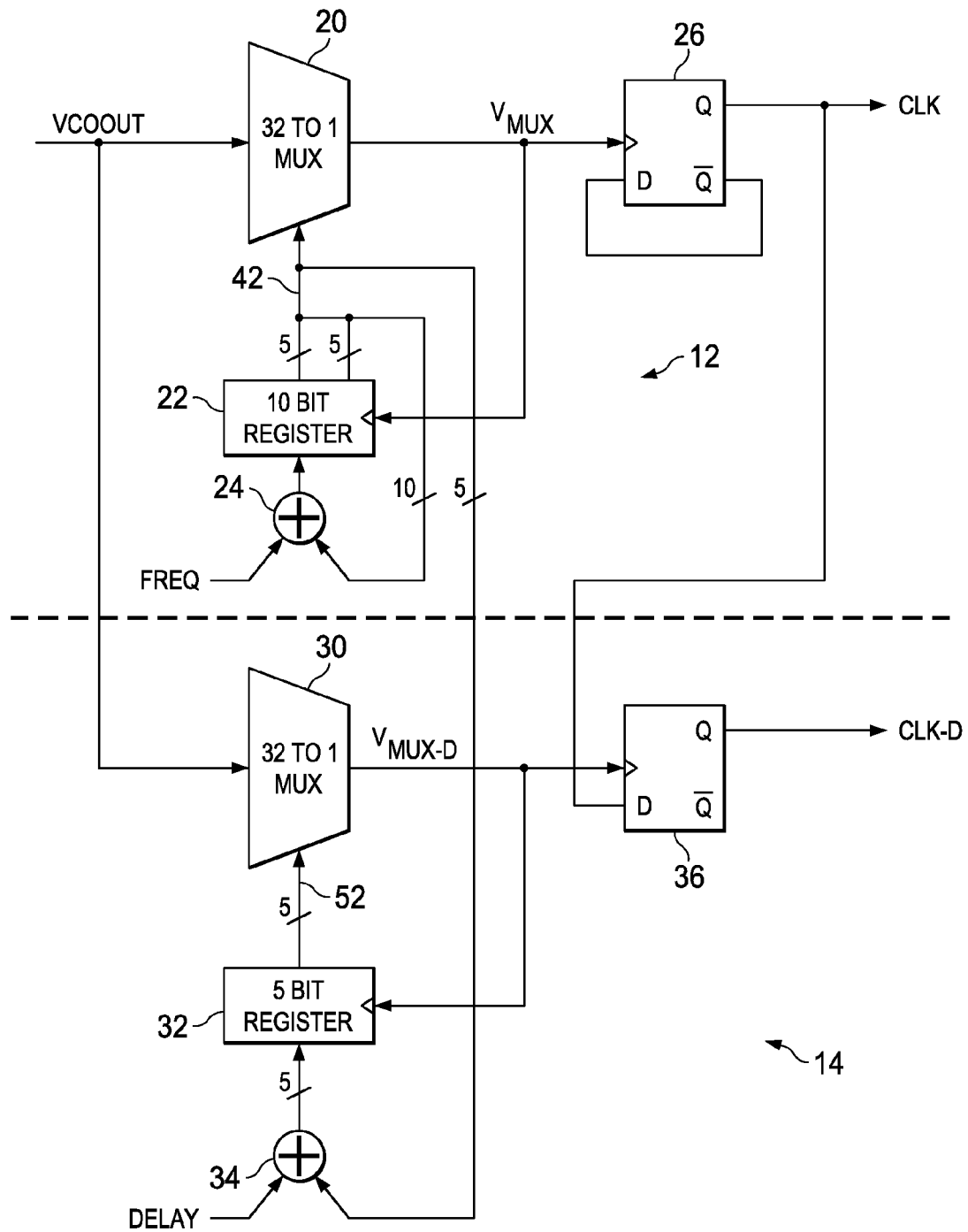
FIG. 1 is a diagram illustrating an example of a conventional frequency and delay synthesis circuit.

Refer now to the drawings wherein depicted elements are, for the sake of clarity, not necessarily shown to scale and wherein like or similar elements are designated by the same reference numeral through the several views.

FIG. 1 is an diagram illustrating an example of a conventional frequency and delay synthesis circuit 10. The frequency and delay synthesis circuit 10 includes a frequency synthesis section 12 and a delay synthesis section 14. Frequency synthesis section 12 includes a multiplexer 20, a register 22, an adder 24 and an output circuit embodied in a toggle flip-flop 26. Delay synthesis section 14 includes a multiplexer 30, a register 32, an adder 34 and an output circuit embodied in a toggle flip-flop 36.

Multiplexer 20 receives an output signal VCOOUT (which is 32 bits long) from a voltage controlled oscillator (VCO). The 32 bits of signal VCOOUT related to 32 output phases from a VCO (not shown in FIG. 1). Multiplexer 20 selects one of the 32 phases of signal VCOOUT according to an address contained in a control signal applied at a control input 42 to present a drive signal $V_{MUX}$. Drive signal $V_{MUX}$ toggles flip-flop 26 to generate a rising or falling edge of a frequency output signal CLK.

Drive signal $V_{MUX}$ is provided to as a clocking signal to 10-bit register 22. The extant signal present at control input 42 is provided to adder 24. In this delivery of the extant signal present at control input 42, the extant address selecting among bits in signal VCOOUT is provided to adder 24. Also provided to adder 24 is a frequency synthesis control word FREQ (which is 10 bits long). In this example, circuit 10 control word FREQ has 5 integer bits (preferably the 5 MSBs) and 5 fraction bits (preferably the 5 LSBs). The fraction bits are used in an accumulating function to get an integer bit over multiple cycles.

Adder 24 combines control word FREQ with the extant address selecting among bits in signal VCOOUT (received with the signal present at control input 42) to present a next multiplexer selection address. When drive signal $V_{MUX}$ clocks register 22, the next multiplexer selection address is provided to control input 42 for use by multiplexer 20 to select a next phase of signal VCOOUT. In this manner, control word FREQ determines the time (i.e., the number of phases of signal VCOOUT) that elapses between the extant address (provided to adder 24 at control input 42) and the next multiplexer address (to be stored in register 22). The phases that elapse between the extant address and the next multiplexer address determine the time difference between succeeding clock edges of frequency output signals CLK. Providing that control word FREQ includes 5 integer bits and 5 fraction bits permits increased granularity in determination of the time that elapses between the extant address and the next multiplexer address.

Multiplexer 30 receives output signal VCOOUT, and multiplexer 30 selects one of the 32 phases of signal VCOOUT according to an address contained in a control signal applied at a control input 52 to present a drive signal $V_{MUX-D}$. Drive signal $V_{MUX-D}$ toggles flip-flop 36 to generate a rising or falling edge of a delay output signal CLK-D.

Drive signal $V_{MUX-D}$ is provided to as a clocking signal to register 32. The extant signal present at control input 42 of multiplexer 20 is provided to adder 34. In this delivery of the extant signal present at control input 42, the extant address selecting among bits in signal VCOOUT in multiplexer 20 (and extant address is the basis of frequency output signal CLK) is provided to adder 34. Also provided to adder 34 is a delay synthesis control word DELAY (which is 5 bits long).

Adder 34 combines control word DELAY with the extant address selecting among bits in signal VCOOUT (received with the signal present at control input 42) to present a next delay selection address. When drive signal $V_{MUX-D}$ clocks register 32, the next delay selection address is provided to a control input 52 to multiplexer 30 to select a next phase of signal VCOOUT for generating delay output signal CLK-D. Control word DELAY determines the time (i.e., the number of phases of signal VCOOUT) that elapses between the extant address (provided to adder 34 from control input 42) and the next delay selection address (to be stored in register 32). The time that elapses between the extant address and the next delay selection address determines the change in delay represented by phase difference between output signals CLK-D and CLK.

Using two multiplexers 20 and 30 and two flip-flops 26 and 36 is disadvantageous. A higher part count increases cost of manufacture, requires larger die area and provides greater opportunity for breakdown of circuit 10 than would be present in an circuit employing fewer parts.

Another disadvantage is present in the structure of circuit 10 because the use of different clocking signals $V_{MUX}$, $V_{MUX-D}$ for registers 22, 32 gives rise to possibility of disparate timing between clocking of registers 22, 32. Drive signal $V_{MUX}$ and drive signal $V_{MUX-D}$ have the same frequency that is determined by control word FREQ. However, the rising edge of drive signal $V_{MUX-D}$ is determined by control word DELAY and may therefore differ from the rising edge of drive signal $V_{MUX}$. If drive signal $V_{MUX}$ is offset with respect to drive signal $V_{MUX-D}$ by an amount less than computation time of the adder 34 summing the two inputs (extant address in the frequency synthesizer multiplexer device and control word DELAY) in delay synthesis section 14, a timing violation may be produced that will render circuit 10 inoperative.

Figure 2:
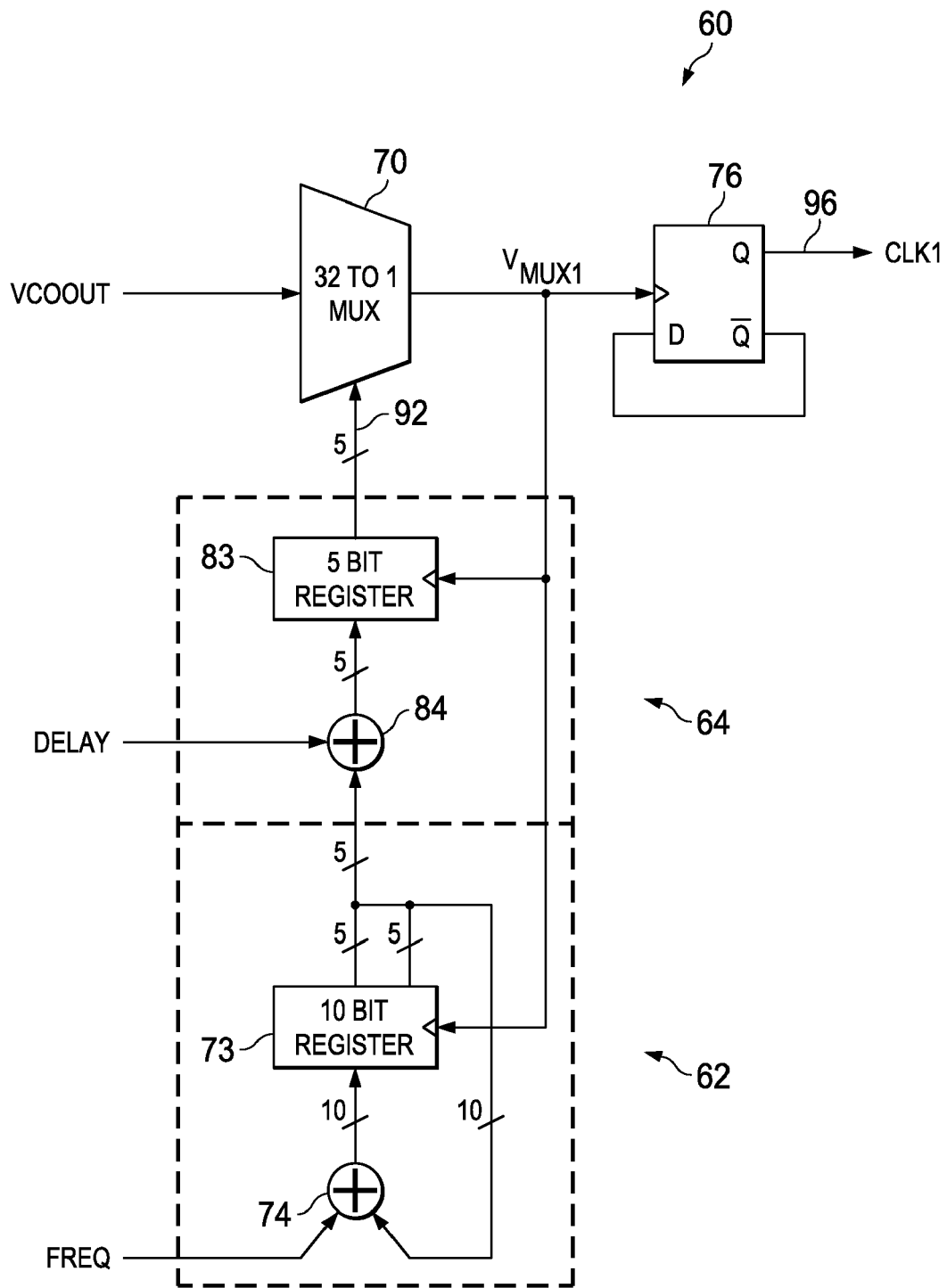
FIG. 2 is a diagram illustrating an example of a frequency and delay synthesis circuit in accordance with a preferred embodiment of the present invention.

FIG. 2 is a diagram illustrating an example of a frequency and delay synthesis in accordance with a preferred embodiment of the present invention. In FIG. 2, a frequency and delay synthesis circuit 60 includes a frequency synthesis section 62, a delay synthesis section 64, a multiplexer 70, and an output circuit (that is generally comprised of a toggle flip-flop 76). Each of the frequency synthesis section 62 and the delay synthesis section 64 share multiplexer 70 and toggle flip-flop 76. Frequency synthesis section 62 includes a register 73, and adder 74. Delay synthesis section 64 includes a register 83 and adder 84.

Multiplexer 70 receives an output signal VCOOUT from a VCO. The 32 bits of signal VCOOUT related to 32 output phases from a VCO (not shown in FIG. 2). Multiplexer 70 selects one of the 32 phases of signal VCOOUT according to an address contained in a control signal applied at a control input 92 to present a drive signal $V_{MUX1}$. Drive signal $V_{MUX1}$ toggles flip-flop 76 to generate a rising or falling edge of an output signal CLK1.

Drive signal $V_{MUX1}$ is provided as a clocking signal for register 73. Output from register 73 represents the extant frequency synthesis address bits for use by multiplexer 70 for frequency-contribution in selecting a value among signal VCOOUT for producing drive signal $V_{MUX1}$ to generate output signal CLK1. Extant frequency synthesis address bits from register 73 include, by way of example and not by way of limitation, 5 integer bits and 5 fraction bits. These extant frequency address bits are provided to adder 74. Also provided to adder 74 is a frequency synthesis control word FREQ (which is 10 bits long). In this example, control word FREQ has 5 integer bits (preferably the 5 MSBs) and 5 fraction bits (preferably the 5 LSBs). The fraction bits are used in an accumulating function to get an integer bit over multiple cycles. Adder 74 combines control word FREQ with the extant frequency synthesis address bits to present a next frequency selection address. When drive signal $V_{MUX1}$ clocks register 73, the next frequency selection address is provided to adder 84. In this manner, control word FREQ determines the time (i.e., the number of phases of signal VCOOUT) that elapses between the extant frequency selection address and the next frequency selection address (to be stored in register 73). The time that elapses between the extant address and the next frequency selection address determines the frequency of CLK1. Providing that control word FREQ includes 5 integer bits and 5 fraction bits permits increased granularity in determination of the time that elapses between the extant address and the next multiplexer address.

Adder 84 receives succeeding frequency selection addresses or signals from register 73, which is clocked by drive signal $V_{MUX1}$. Also provided to adder 84 is a delay synthesis control word DELAY (which is 5 bits long). Adder 84 combines control word DELAY with the extant frequency selection address to present an aggregate selection address at control input 92 to multiplexer 70. The aggregate selection address is a composite selecting signal involving frequency synthesis characteristics related with frequency control word FREQ and involving delay synthesis characteristics related with delay control word DELAY. When drive signal $V_{MUX1}$ clocks register 83, the next aggregate selection address is provided to control input 92 for use by multiplexer 70 to select a next phase of signal VCOOUT for generating output signal CLK1. Control word DELAY determines the time (i.e., the number of phases of signal VCOOUT) that elapses between the extant frequency selection address (provided to adder 84 from register 73) and the next aggregate selection address (stored in register 83).

Use of a single multiplexer 70 and clocking both registers 73, 83 with drive signal $V_{MUX1}$ in synthesis circuit 60 avoids the shortcomings and disadvantages described in connection with prior art synthesis circuit 10 of FIG. 1 so that the possibility of disparate timing between clocking of registers 73 and 83 is eliminated. As a result, no timing violation may be produced with respect to either of adders 74 and 84.

Selection performed by multiplexer 70 is controlled by a multi-bit address, as described above. It is known that multi-bit address switching can take time because not all bits necessarily switch at the same time. Some settling time is recommended to ensure true selection by a multiplexer such as multiplexer 70. A solution to this problem is to provide a duplex multiplexing architecture so that one multiplexer can be engaged in the process of switching address bits while the other multiplexer can be driving an output flip-flop. The circuit illustrated in FIG. 3 is an example of such a duplex multiplexing architecture in accordance with a preferred embodiment of the present invention.

Circuit 10 of FIG. 1 and circuit 60 of FIG. 2 are described herein to illustrate the advantage of providing a single clocking signal to registers provided for frequency synthesis and for delay synthesis. A significant difference between circuit 10 of FIG. 1 and circuit 60 of FIG. 2 is that circuit 10 generates two clock signals with an intended phase relation, while circuit 60 of FIG. 2 generates one clock signal with a capability for phase adjustment with respect to a preceding clock edge of the signal. Circuit 10 and circuit 60 are not direct replacement circuit for each other without additional supporting circuitry.

Figure 3:
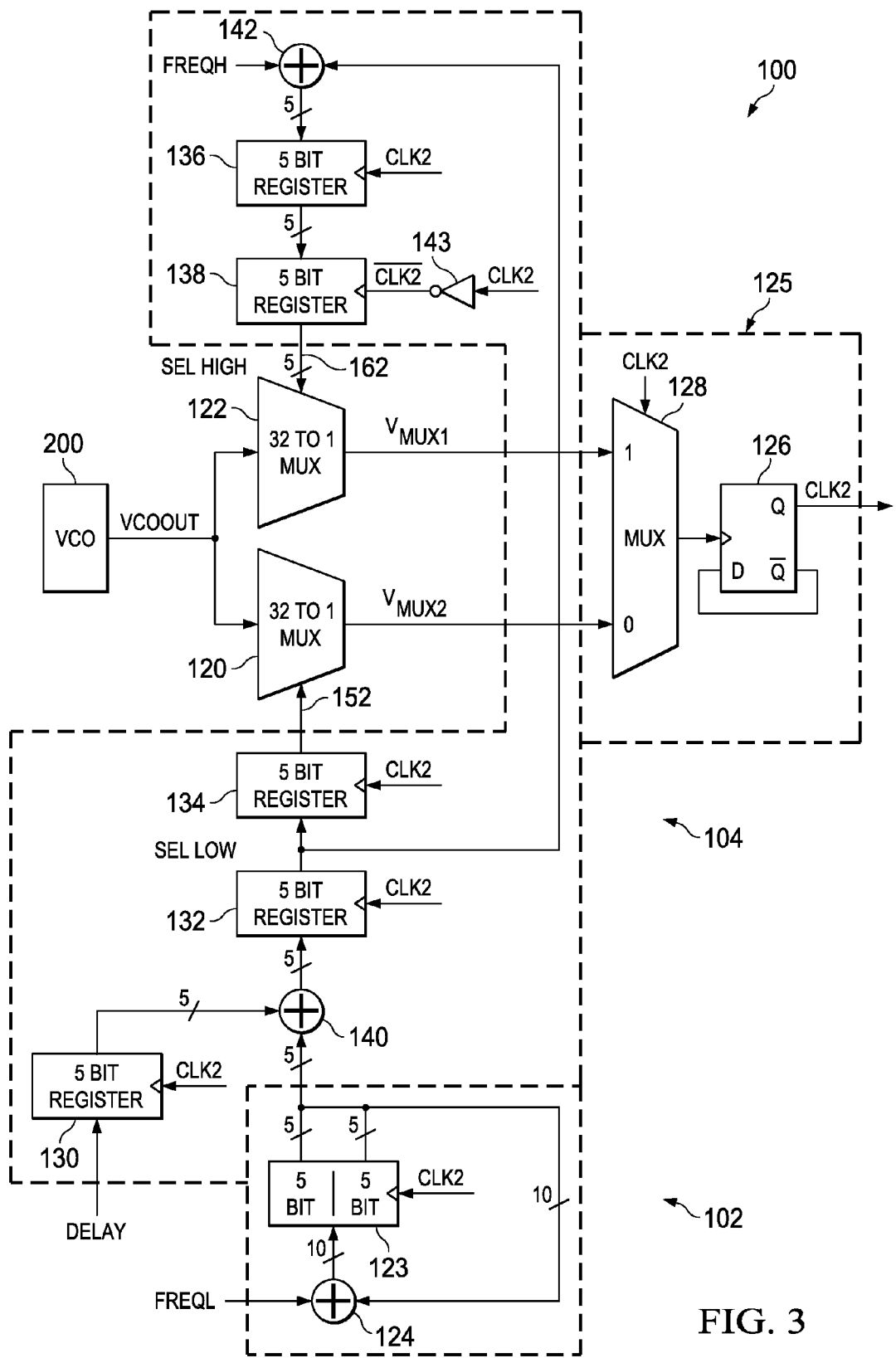
FIG. 3 is a diagram illustrating an example of a frequency and delay synthesis circuit in accordance with a preferred embodiment of the present invention.

Turning to FIG. 3, a diagram illustrating an example of a frequency and delay synthesis circuit in accordance with a preferred embodiment of the present invention is shown. In FIG. 3, a frequency and delay synthesis circuit 100 includes multiplexers 122 and 125, frequency synthesis section 102, delay synthesis section 104, and output section 125. Output circuit 125 is generally comprised of a toggle flip-flop 126 and a two-to-one multiplexer 128. Frequency synthesis section 102 includes a register 123 and a adder 124. Delay synthesis section 104 shares includes registers 130, 132, 134, 136, and 138 and adders 140, 142.

Each of multiplexers 120 and 122 receives an output signal VCOOUT (which is 32 bits long) from a VCO. The 32 bits of signal VCOOUT related to 32 output phases from a VCO 200. Multiplexer 120 selects one of the 32 phases of signal VCOOUT according to an address contained in a control signal applied at a control input 152 to present a drive signal $V_{MUX2}$. Multiplexer 122 selects one of the 32 phases of signal VCOOUT according to an address contained in a control signal applied at a control input 162 to present a drive signal $V_{MUX1}$. Drive signals $V_{MUX2}$ and $V_{MUX1}$ are applied to multiplexer 128. Multiplexer 128 selects one of the drive signals $V_{MUX1}$ and $V_{MUX2}$ in response to output signal CLK2 to present a selected drive signal. Specifically, in this example, when output signal CLK2 is a "1", multiplexer 128 passes drive signal $V_{MUX1}$, and when output signal CLK2 is a "0", multiplexer 122 passes drive signal $V_{MUX2}$. The selected drive signal $V_{MUX1}$ and $V_{MUX2}$ toggles flip-flop 126 to generate a rising or falling edge of an output signal CLK2.

Output signal CLK2 is provided at as a clocking signal for register 123. Output from register 123 represents the extant frequency synthesis address bits for use (after two clock cycles) by multiplexers 120 and 122 for frequency-contribution in selecting a value among signal VCOOUT for producing drive signals to generate output signal CLK2. Extant frequency synthesis address bits from register 123 include, by way of example and not by way of limitation, 5 integer and 5 fraction bits. These extant frequency address bits are provided to adder 124. Also provided to adder 124 is a frequency synthesis control word FREQ (which is 10 bits long). In this example, control word FREQ has 5 integer bits (preferably the 5 MSBs) and 5 fraction bits (preferably the 5 LSBs). The fraction bits are used in an accumulating function to get an integer bit over multiple cycles. Adder 124 combines control word FREQ with the extant frequency synthesis address bits to present a next frequency selection address. When output signal CLK2 clocks register 123, the next frequency selection address is provided to adder 140. In this manner, control word FREQ determines the time (i.e., the number of phases of signal VCOOUT) that elapses between the extant frequency selection address and the next frequency selection address (to be stored in register 123). The time that elapses between the extant address and the next frequency selection address determines the amount of phases in VCO in one period time of output signals CLK2. Providing that control word FREQ includes 5 integer bits and 5 fraction bits permits increased granularity in determination of the time that elapses between the extant address and the next multiplexer address.

Adder 140 receives succeeding frequency selection addresses or signals from register 123 as register 123 is clocked by output signal CLK2. Also provided to adder 140 is a delay synthesis control word DELAY (which is 5 bits long). Control word DELAY is stored in a register 130. Output signal CLK2 is provided at as a clocking signal for register 130 to provide control word DELAY to adder 140 in substantial synchrony with the clocking of the succeeding frequency selection addresses from register 123.

Adder 140 combines control word DELAY with the extant frequency selection address to present an aggregate selection address to register 132. The aggregate selection address is a composite selecting signal involving frequency synthesis characteristics related with frequency control word FREQ and involving delay synthesis characteristics related with delay control word DELAY. Output signal CLK2 is provided at a clocking node 133 of register 132. When output signal CLK2 clocks register 132, the next aggregate selection address is provided to register 134 and is provided to adder 142.

One may observe that registers 123 and 132 and adders 124 and 140 are configured in an arrangement similar to the circuitry described in FIG. 2. Register 123 is responsible for frequency generation and register 132 is responsible for delay generation. Control word DELAY is synchronized before it is provided to adder 140 by clocking control word DELAY through register 130. Registers 123, 130, and 132 are associated with multiplexer 120 and each of registers 123, 130, and 132 is clocked by a rising edge of output signal CLK2 because the drive signal presented by multiplexer 120 is passed through multiplexer 128 when CLK2 is equal to "0". This clocking arrangement provides substantially a first one-half clock cycle time (measured by output signal CLK2) for multiplexer 120 to switch its address bits for selecting a phase of signal VCOOUT.

The address applied to control input 152 of multiplexer 120 is changed only once during one clock cycle of output signal CLK2. This one address update or change triggers flip-flop 126 to generate one clock edge only (for example, a rising edge). In order to generate a full output clock signal it is necessary to employ multiplexer 122 to generate another clock edge (for example, a falling edge).

Registers 136 and 138 and adder 142 provide the other required clock edge. Adder 142 receives the next aggregate selection address from register 132. Also provided to adder 142 is a half-clock-cycle control word FREQH. Half-Clock-cycle control word FREQH is obtained from a portion of control word FREQ. Half-Clock-cycle control word FREQH has 5 most significant bits (<10:6>) of control word FREQ. Half-clock-cycle control word FREQH is generated by one-bit-right-shifting frequency control word and adding a zero in the tenth bit place (i.e., setting FREQ <10> to "0"). That is, adding a zero as a tenth bit to control word FREQH to establish a bit is effectively a one bit right shifting of word. Since, in a binary number system, one bit right shifting is equivalent to dividing by two, the number of FREQH is roughly half of the number of the one-bit-right-shifting frequency control word. Therefore, one-bit-right-shifting frequency control word is called frequency control word and FREQH is called half-clock-cycle control word. The summed signals from adder 142 are provided to register 136. The contents of register 136 are provided to register 138 as register 136 is clocked by output signal CLK2.

Output signal CLK2 is provided to register 136 and inverter 143. Inverter 143 provides an inverted output signal $\overline{CLK2}$ to register 138. Registers 136 and 138 are associated with multiplexer 122. The drive signal presented by multiplexer 122 is passed through multiplexer 128 when signal CLK2 is equal to "1". Register 138 uses the inverse signal $\overline{CLK2}$. This clocking arrangement provides substantially a second one-half clock cycle time multiplexer 122 to switch its address bits for selecting a phase of signal VCOOUT.

During a first one-half clock cycle, the contents of register 134 are provided to control input 152 of multiplexer 120 by signal CLK2 being applied to as a clocking signal for register 134. During this one-half clock cycle, signal CLK2 has a value of "1" so multiplexer 128 passes the drive signal presented by multiplexer 122. The clocking signal $\overline{CLK2}$ at clocking node 139 has a value "0" so no bits are clocked out of register 138. The switching of address bits in multiplexer 122 was completed and settled during the previous one-half clock cycle.

During a second one-half clock cycle, the contents of register 138 are provided to multiplexer device 122 by the inverse signal $\overline{CLK2}$ being applied as a clocking signal for register 138. During this second one-half clock cycle, output signal CLK2 has a value of "0" so multiplexer 128 passes the drive signal presented by multiplexer 120 and no bits are clocked out of register 134. The switching of address bits in multiplexer 120 was completed and settled during the first one-half clock cycle. The first one-half clock cycle time during which multiplexer 120 switches address bits is preferably substantially mutually exclusive with respect to the second one-half clock cycle time during which multiplexer 122 switches address bits.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

We claim:

1. An apparatus comprising:
   a first multiplexer that receives a first signal;
   a second multiplexer that receives the first signal;
   an output circuit that is coupled to each of the first and second multiplexers;
   a delay synthesis section having:
      a first adder that receives at first portion of a control word; and
      a first register that is coupled to the first adder and the output circuit, wherein
   the output circuit clocks the first register; and
   a frequency synthesis section having:
      a second adder that receives a second portion of the control word;
      a first set of registers that are coupled in series with one another, wherein each register from the first set of registers is coupled to the output circuit so as to be clocked by the output circuit, wherein the first register from the first set of registers is coupled to the second adder and the last register from the first set of registers is coupled to a control input of the first multiplexer;
      a second register that is coupled to the output circuit and that receives a delay signal, wherein the output circuit clocks the second register;
      a third adder that is coupled to the second register and the first register; and
      a second set of registers that are coupled in series with one another, wherein each register from the second set of registers is coupled to the output circuit so as to be clocked by the output circuit, wherein the first register from the second set of registers is coupled to the third adder and the last register from the second set of registers is coupled to a control input of the second multiplexer.

2. The apparatus of claim 1, wherein the first adder is coupled to at least one register from the second set of registers.

3. The apparatus of claim 2, wherein the first set of registers further comprises:
   a third register that is coupled to the first adder and the output circuit; and
   a fourth register that is coupled to the third register, the output circuit, and the control input of the first multiplexer.

4. The apparatus of claim 3, wherein the first set of register further comprises an inverter that is coupled between the fourth register and the output circuit.

5. The apparatus of claim 1, wherein the second set of registers further comprises:
   a third register that is coupled to the first adder, the third adder, and the output circuit; and
   a fourth register that is coupled to the third register, the output circuit, and the control input of the second multiplexer.

6. The apparatus of claim 1, wherein the output circuit further comprises:
   a third multiplexer that is coupled to each of the first and second multiplexers; and
   a flip-flop that is coupled to the third multiplexer.

7. An apparatus comprising:
   a voltage controlled oscillator (VCO);
   a first multiplexer that is coupled to the VCO;
   a second multiplexer that is coupled to the VCO;
   an output circuit that is coupled to each of the first and second multiplexers;
   a delay synthesis section having:
      a first adder that receives at first portion of a control word; and
      a first register that is coupled to the first adder and the output circuit, wherein
   the output circuit clocks the first register; and
   a frequency synthesis section having:
      a second adder that receives a second portion of the control word;
      a first set of registers that are coupled in series with one another, wherein each register from the first set of registers is coupled to the output circuit so as to be clocked by the output circuit, wherein the first register from the first set of registers is coupled to the second adder and the last register from the first set of registers is coupled to a control input of the first multiplexer;
      a second register that is coupled to the output circuit and that receives a delay signal, wherein the output circuit clocks the second register;
      a third adder that is coupled to the second register and the first register; and
      a second set of registers that are coupled in series with one another, wherein each register from the second set of registers is coupled to the output circuit so as to be clocked by the output circuit, wherein the first register from the second set of registers is coupled to the third adder and the last register from the second set of registers is coupled to a control input of the second multiplexer.

8. The apparatus of claim 7, wherein the first adder is coupled to at least one register from the second set of registers.

9. The apparatus of claim 8, wherein the first set of registers further comprises:
   a third register that is coupled to the first adder and the output circuit; and
   a fourth register that is coupled to the third register, the output circuit, and the control input of the first multiplexer.

10. The apparatus of claim 9, wherein the first set of register further comprises an inverter that is coupled between the fourth register and the output circuit.

11. The apparatus of claim 7, wherein the second set of registers further comprises:
    a third register that is coupled to the first adder, the third adder, and the output circuit; and a fourth register that is coupled to the third register, the output circuit, and the control input of the second multiplexer.

12. The apparatus of claim 7, wherein the output circuit further comprises:

a third multiplexer that is coupled to each of the first and second multiplexers; and a flip-flop that is coupled to the third multiplexer.

* * * * *